United States Patent [19]

Weakley

[11] 4,303,906

[45] Dec. 1, 1981

[54] VEHICLE ACCELERATION MONITORING DEVICE

[75] Inventor: Burton Weakley, Sandton, South Africa

[73] Assignee: Plustronix (Proprietary) Limited, Wynberg, South Africa

[21] Appl. No.: 87,538

[22] Filed: Oct. 23, 1979

[30] Foreign Application Priority Data

Nov. 6, 1978 [ZA] South Africa ............... 78/6232

[51] Int. Cl.³ .................................... B60Q 9/00
[52] U.S. Cl. .................... 340/52 R; 340/53; 340/669; 200/61.45 R
[58] Field of Search ............ 340/52 R, 52 F, 52 H, 340/53, 65, 669; 200/61.45 R

[56] References Cited

U.S. PATENT DOCUMENTS 3,538,496 11/1970 Bumpous .................. 340/669

4,101,869 7/1978 Henderson ............... 340/52 R

*Primary Examiner*—Alvin H. Waring
*Attorney, Agent, or Firm*—Hopgood, Calimafde, Kalil, Blaustein & Judlowe

[57] ABSTRACT

Apparatus for monitoring the manner in which a vehicle is driven. The apparatus includes a number of switches which are arranged to detect excessive accelerative forces in chosen horizontal directions and in the vertical direction. Each switch includes a capsule with mercury sealed inside the capsule and is so arranged that contacts at the lower end of the capsule are normally bridged by the mercury but are open circuited when the mercury is subjected to a predetermined accelerative force and so is moved upwardly in the capsule. Detectors sense the open circuiting of a switch and after an optional delay period cause an alarm to be sounded and advance a counter.

4 Claims, 3 Drawing Figures

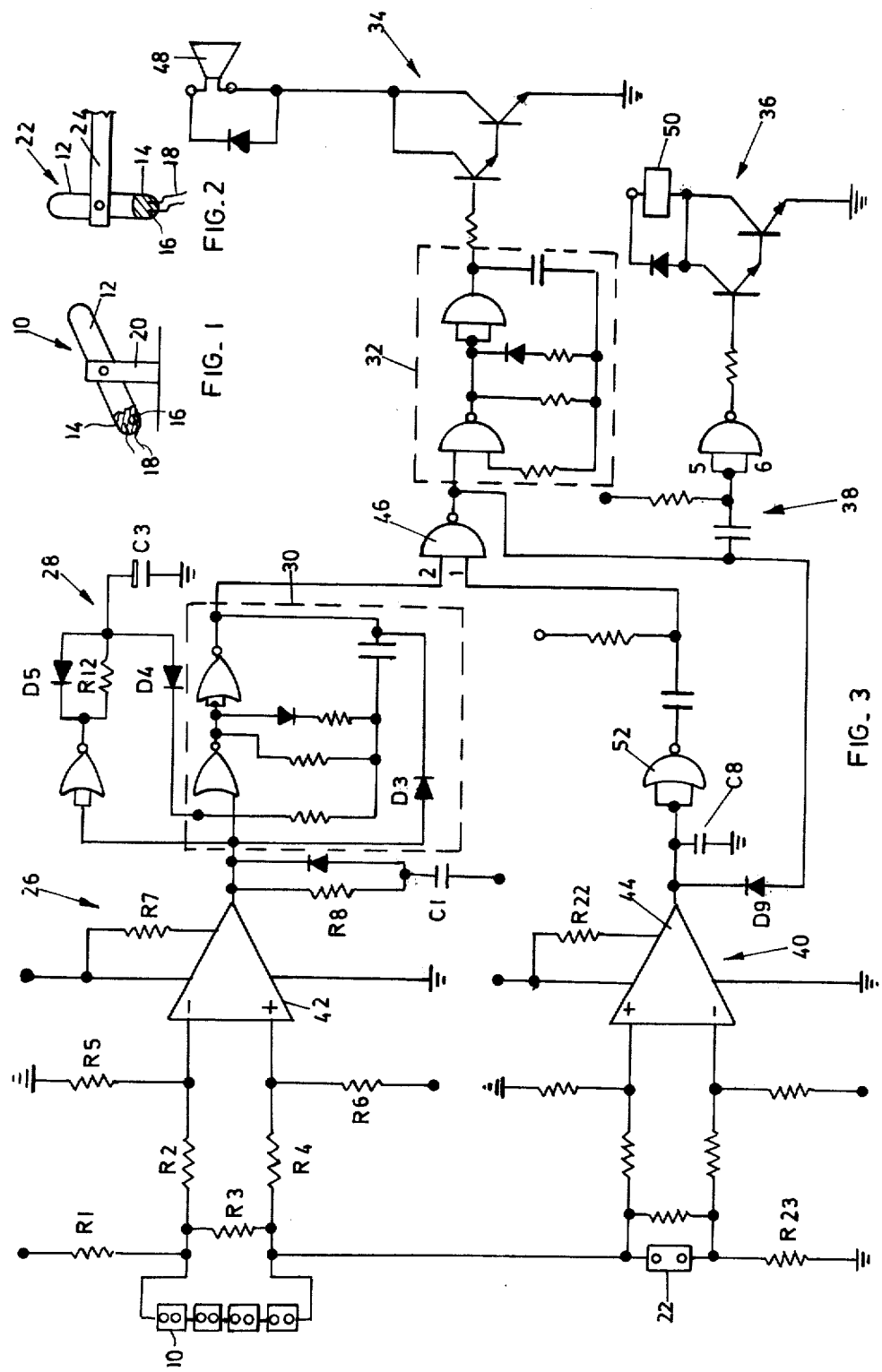

VEHICLE ACCELERATION MONITORING DEVICE

BACKGROUND OF THE INVENTION

THIS invention relates to apparatus for monitoring the manner in which a vehicle is driven. The apparatus may be used to record instances of poor driving or to provide an indication to the driver of a vehicle or some other person that the vehicle is being badly driven.

Devices of this type which provide warning or recording signals when a vehicle is subjected to excessive acceleration during cornering, or when a vehicle is driven at speed over a badly potholed road or rough surface, are known. Generally such devices include switches which consist of tubes which contain mercury and which are installed in the vehicle at an incline so that accelerative forces on the switch cause a globule of mercury to travel up the inclined tube or capsule and if the accelerative force is sufficiently high electrically to connect a pair of contacts at the upper end of the tube.

To prevent spurious operation of the switch caused for example by splashing of the mercury the capsules have been made relatively long so that the contacts at the upper end of the capsule are well spaced from the mercury at the lower end of the capsule. This solution however carries with it its own disadvantages for the mercury must travel a fairly long distance inside the tube before the contacts are closed and the travel time may vary from switch to switch because of different surface tension effects, capsule sizes and capsule linearities.

SUMMARY OF THE INVENTION

It is an object of the present invention to provide an improved vehicle monitor.

The invention provides apparatus for monitoring the manner in which a vehicle is driven which comprises switch means which is actuated when subjected to predetermined accelerative forces, and means to monitor the operation of the switches, wherein the switch means includes at least one switch comprising a container, a pair of contacts at the lower end of the container, and a conductive material in the container which normally bridges the contacts and which moves away from the contacts, open circuiting them, when subjected to a predetermined accelerative force.

The container may be a capsule and the conductive material may be mercury sealed in the capsule.

For recording excess accelerative forces in the horizontal plane the switch means may include four of the switches, arranged, in plan, at 90° from one another with each capsule being inclined to the horizontal so that the mercury, when subjected to a predetermined accelerative force, travels upwardly in the capsule. The switches may be connected in series.

The monitoring means may include a first detector to detect the open-circuiting of any of the four switches and to generate a first signal.

Excess accelerative forces in the vertical direction may be detected by means of a fifth switch disposed with the capsule substantially vertically aligned.

The monitoring means may include a second detector to detect the open-circuiting of the fifth switch and to generate a second signal.

Further according to the invention the first and second signals generate third and fourth signals respectively which are audible and which are distinguishable from each other.

Further according to the invention the apparatus includes means to provide a count which is dependent on the number of times the switches are actuated. The counting means may be actuated by the first and second signals.

BRIEF DESCRIPTION OF THE DRAWINGS

The invention is further described by way of example with references to the accompanying drawings in which:

FIGS. 1 and 2 illustrate two types of switches used in the apparatus of the invention, and FIG. 3 is a circuit diagram of apparatus according to the invention.

DESCRIPTION OF A PREFERRED EMBODIMENT

FIG. 1 illustrates a switch 10 which consists of a glass tube 12 in which is sealed a quantity of mercury 14. Two contacts 16 are located at one end of the tube. These contacts are connected to leads 18.

The tube 12 is mounted on a support 20 and is adjustably inclined to the horizontal. Thus the mercury in the tube normally bridges the contacts 16.

FIG. 2 illustrates a switch 22 which is identical to the switch 10 but which is attached to a support 24 with the tube 12 vertical.

The circuit shown in FIG. 3 consists of the following distinct parts;

A first detector 26, a timer circuit 28, a first oscillator 30, a second oscillator 32, an audible output stage 34, a counter circuit 36, a differentiator 38 and second detector 40.

The first detector 26 includes an operational amplifier 42 with input terminals which are bridged by four switches 10 of the type shown in FIG. 1 connected in series. These switches are arranged, in plan, at 90° from each other and are aligned in a vehicle so that a first switch is particularly responsive to excessive acceleration, a second switch to excessive braking, and the third and fourth switches to excessive centrifugal forces caused by sharp cornering of the vehicle to the right or the left respectively.

The second detector 40 includes an operational amplifier 44 with input terminals which are bridged by a switch 22 of the type shown in FIG. 2. Thus the first detector is responsive to accelerative forces in the horizontal plane while the second detector is responsive to vertical accelerative forces.

If the four switches 10 connected to the operational amplifier 42 are closed, as is the case when the vehicle is being driven within specified limits, the output of the operational amplifier 42 is high because of a small positive offset bias applied to its input terminals through resistors R6 and R4, the switches 10, and resistors R2 and R5. The first oscillator is disabled under this condition.

If the vehicle is subjected to a high accelerative force in the horizontal plane, for example, by excessive braking or acceleration or sharp cornering in either direction, one of the switches 10 opens and a current flowing through resistances R1 and R3, the leakage resistance of the switches, the switch 22 and a resistance R23 causes a small negative offset bias to be applied to the terminals of the operational amplifier 42 and its output goes low.

When the operational amplifier 42 switches in this way a capacitor C1 connected to its output terminal discharges through a resistance R8 and the internal resistance of the amplifier which is determined by a bias current applied through a resistance R7, and after a delay of approximately 150 milliseconds the output is applied to the first oscillator 30 which is thereby enabled.

The oscillator 30 runs for a period, typically three cycles, determined by the timer 28. The timer includes a capacitor C3 which is charged through a resistance R12 and the voltage across C3 on reaching a predetermined value disables the timer through a diode D4. The timer is reset through a diode D5 when the output of the operational amplifier 42 goes high.

The second oscillator 32 is controlled by the output of a nand gate 46. The first oscillator 30 when enabled applies a negative pulse to a pin 2 of the nand gate 46 and consequently a positive pulse is applied to the second oscillator 32.

The oscillator 32 when enabled generates an audio signal which is amplified by the transistor output stage 34 and applied to a loudspeaker 48 to produce an audible signal. The trailing edge of the positive input pulse to the second oscillator 32 is differentiated by the differentiator 38 and applied to the counter circuit 36 thereby causing a counter 50 to be advanced.

A similar process takes place when the switch 22 is opened. In this instance the operational amplifier 44 switches producing a single negative pulse, as opposed to the three pulses produced by the first oscillator 30. This pulse is delayed for approximately 30 milli-seconds by a capacitor C8 and resistor R22 and if the pulse is of a suitable duration a pulse of duration of approximately half a second is generated by a nor gate 52 because of a positive level input signal supplied to pins 1 and 2 of the nor gate through a diode D9. The pulse produced by the nor gate 52 enables the second oscillator 32 and causes the counter circuit to be advanced.

It is necessary to use a delay stage with each of the detectors 26 and 40 to eliminate spurious effects and switching of the operational amplifiers 42 and 44. The first detector 26, as already indicated, is responsive to horizontal accelerative forces and causes the loudspeaker 48 to produce an audible signal of a relatively long period. The counter 50 also advances. On the other hand the second detector 40 which is responsive to vertical accelerative forces produces an audible signal of a relatively short period and causes the counter 36 to be advanced only one step. A distinction is therefore made between the two different types of driving faults.

I claim:

1. Apparatus for monitoring the manner in which a vehicle is driven which comprises switch means which are actuated when subjected to predetermined accelerative forces and means to monitor the operation of said switches;

wherein said switch means include at least five series connected switches, each switch comprising a container, a pair of contacts at the lower end of the container and conductive material located in the container which normally bridges the contacts, four of said switches being arranged at angular intervals of 90° from one another with each capsule being inclined to the horizontal so that the conductive material travels upwardly and moves away from the contacts open-circuiting them when subjected to a predetermined accelerative force, and a fifth switch disposed with its container substantially vertically aligned;

said monitor means including first and second detectors, said first detector detecting the open-circuiting of any of said four switches to generate a first signal, said second detector detecting the open-circuiting of said fifth switch to generate a second signal.

2. Apparatus according to claim 1 in which the container comprises a capsule and the conductive material is mercury which is sealed in the capsule.

3. Apparatus according to claim 1 in which the first and second signals generate third and fourth signals respectively which are audible and which are distinguishable from each other.

4. Apparatus according to claim 3 which includes counting means which is actuated by the first and second signals.

* * * * *